United States Patent [19]

Tavazza et al.

[11] Patent Number: 4,561,482
[45] Date of Patent: * Dec. 31, 1985

[54] ANTI-BEAD UNSEATING MOUNTING-RIM FOR VEHICLE TIRES

[75] Inventors: Giuseppe Tavazza; Franco Bottasso, both of Milan, Italy

[73] Assignee: Societa Pneumatici Pirelli SpA, Milan, Italy

[ * ] Notice: The portion of the term of this patent subsequent to Mar. 5, 2002 has been disclaimed.

[21] Appl. No.: 501,818

[22] Filed: Jun. 7, 1983

[30] Foreign Application Priority Data

Jun. 11, 1982 [IT] Italy ............................... 21840 A/82

[51] Int. Cl.$^4$ ............................................. B60B 25/12
[52] U.S. Cl. ................................ 152/381.4; 152/375; 152/379.5
[58] Field of Search ................... 152/375, 379.3, 381.3, 152/381.4, 379.4, 379.5, 330 RF; 301/95, 96, 97, 98

[56] References Cited

U.S. PATENT DOCUMENTS

| 2,948,568 | 8/1960 | Hykes et al. | 301/97 X |
| 3,977,727 | 8/1976 | Glasenapp et al. | 301/97 |
| 4,042,003 | 8/1977 | Gaskill et al. | 152/381.4 |
| 4,190,092 | 2/1980 | Evans et al. | 152/381.4 |
| 4,246,950 | 1/1981 | Welter | 152/381.4 |
| 4,351,382 | 9/1982 | Corner et al. | 152/381.4 |
| 4,502,521 | 3/1985 | Tavazza et al. | 152/381.4 |

Primary Examiner—Robert B. Reeves
Assistant Examiner—Russell D. Stormer
Attorney, Agent, or Firm—Stevens, Davis, Miller & Mosher

[57] ABSTRACT

This device consists of a wheel rim having a protuberance that protrudes radially outwardly with respect to the bead seat, the height of which, with respect to said seat, varies from a maximum to a minimum, both along the rim circumference as well as along the axis thereof. The minimum values are found along the axial extremities of said protuberance and not lying in the same axial plane.

10 Claims, 5 Drawing Figures

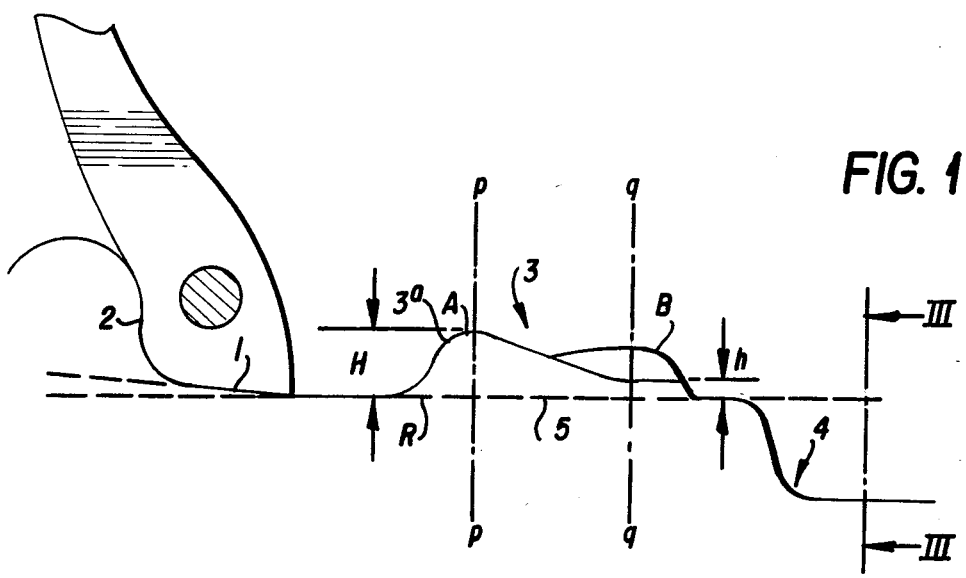
FIG. 1
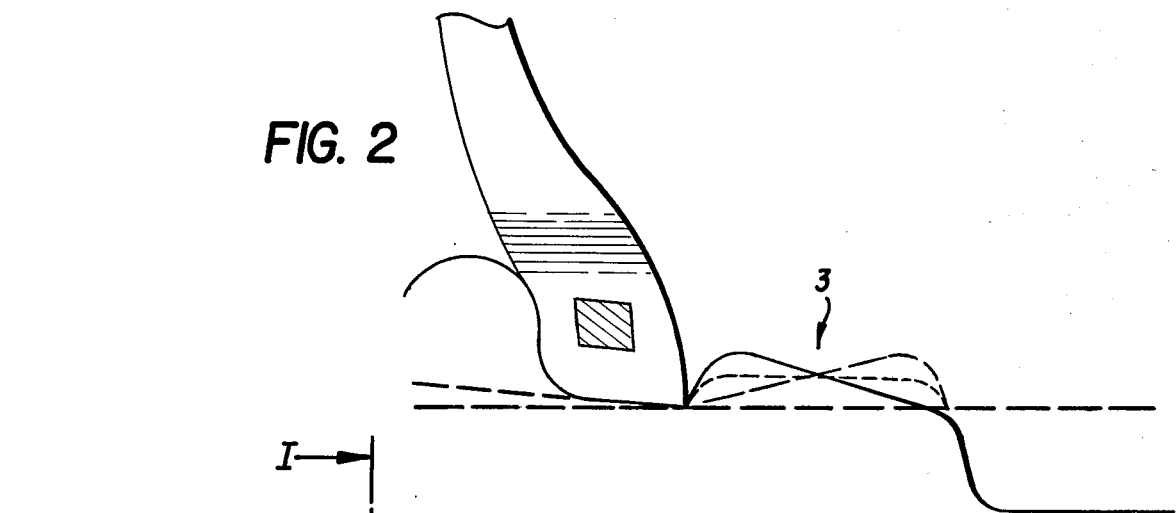
FIG. 2
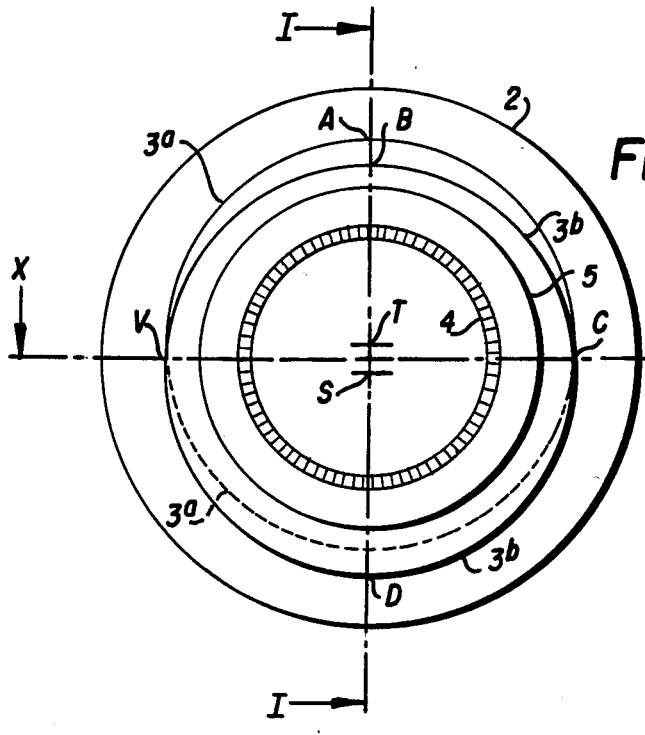
FIG. 3
FIG. 4

ANTI-BEAD UNSEATING MOUNTING-RIM FOR VEHICLE TIRES

BACKGROUND OF THE INVENTION

The present invention concerns the rims for tires, a complete rim-wheel assembly and, in particular, it concerns the rims provided with devices to prevent tire bead unseating.

When a vehicle travels in a curve, the sidewall of the vehicle tires are subjected to a force, directed substantially parallel to the axis of the wheel itself, the intensity of which varies depending upon the speed of the vehicle and the radius of curvature of the path.

This force acts also on the bead of the tire (in a direction towards the axially inner zone of the rim), and it is counteracted almost exclusively by the inflation pressure of the tire, so much so that, in the instance of even a partial deflation of the tire, when this counteracting action is reduced, it could happen that the tire bead may shift from its normal seat on the rim and drops into the central well which is normally used for tire fitment. As a consequence of this, almost certainly there results a loss of driving control by the driver over the vehicle, involving dangerous risks and sometimes even tragic consequences to life itself.

For this reason, the problem of preventing any shifting of the bead has always been considered important, but it has now become still more important with increase of vehicle speed, which has become more likely because of improvements in road conditions and improved driving performance of vehicles themselves.

To this purpose, for some time past, there has been planned and there are, moreover, already known, many devices intended to maintain the bead on the rim. Among these devices, those that are more generally adopted consist of a particular protrusion better known as a "hump", which is formed on the rim in the vicinity of the axially inner extremity of the bead seat, protruding radially outwardly for a constant height with respect to the bead seat, and which is intended to constitute an insurmountable obstacle in the axial shifting path of the bead.

A practical consideration is the necessity for the tire's carcass bead to be able to pass over said "hump" during the mounting of the tire upon the rim. The height of said "hump", with respect to the bead seat, cannot exceed a certain given value. In fact, if the height of said "hump" is so raised as to positively block the bead on the tire rim, then it will be impossible to mount the tire on a one-piece rim.

The height of said "hump" thus must be of such a value that it is possible for the tire bead to pass over said "hump" (during the mounting phase of the tire onto the rim), by exploiting the flexibility of the metallic bead core, which enables the bead core, although inextensible in circumference, to assume an elliptical configuration, and by exploiting the compressibility of the elastomeric material that covers the radially inner surface of said metallic bead core.

Thus, there is obtained a characteristic compromise between having a certain degree of difficulty in mounting the tire, but also having a corresponding sealing capacity of the rim to the bead when the vehicle is cornering with a partially deflated tire, down to about 60% of the normal inflation. To improve this situation, there have been proposed rims having asymmetrical "humps", i.e., with a variable height along at least one part of the rim circumference, from a minimum value to a maximum value and vice-versa.

In reality, the above-mentioned variant has not completely solved the problem. In fact, if, in spite of the increase in height of the "hump" along a portion of the circumference of the bead seat the circumferential development of said "hump" is maintained constant, the ease of mounting of the tire onto the rim will not be improved. While, with regard to the bead unseating ability, the behavior of the rim will become unsatisfactory along the portion of the rim circumference where said height is less as compared to the normal heights of the usual "humps".

On the contrary, if a greater height is obtained by increasing the height of a usual symmetrical "hump" along a portion of its development, in such a way that the total hump circumference increases, it will surely result in less bead unseating; but, at the same time, also a notable increase in the difficulty in mounting the tire on the rim.

There has been proposed by the applicants themselves, in copending application Ser. No. 4,80,329 now U.S. Pat. No. 4,502,521, filed Mar. 30, 1983, rims having two or more "humps" placed side-by-side, each one having a circumference such as to be able to easily be crossed-over by the tire bead during the mounting of the tire onto the rim, but which, owing to the fact that such "humps" are eccentrically disposed with respect to the rim axis taken as a whole, constitute an obstacle having a considerable height for the tire bead, resulting in a sure advantage with regard to resisting any bead unseating.

Nevertheless, these side-by-side "humps" are not completely satisfactory, owing to the fact that during the tire-mounting phase they allow leakages (although slight) of air, until such time as the beads are stably housed on their seats. Moreover, under particular conditions of use, each "hump" can represent a fulcrum point for the bead to overcome; thus inducing risky and dangerous bead rotation around said fulcrum.

BRIEF DESCRIPTION OF THE INVENTION

The applicants have now devised a new means for an anti-bead unseating hump, which results in keeping all the advantages of the previously-mentioned side-by-side humps, while eliminating the above-mentioned drawbacks.

Hence, a first object of the present invention is a mounting rim for vehicle tires that comprises a pair of bead seats, each terminating, in an axially outer position, with a flange that is radially outwardly extending, at least one of said bead seats being connected at its portion toward the center of the wheel to a radially outwardly extending protuberance, said rim being characterized by the fact that the radial height of said protuberance, with respect to the cylindrical surface coaxial with said rim, which constitutes an extension of the minimum diameter of said bead seat axially towards the inside, varies from a maximum value to a minimum value, and, once again, to a maximum value along the circumferential development of said protuberance and on at least two distinct planes orthogonal to the axis of rotation of the rim, each disposed at one extremity of said protuberance, two maximum radial heights of said protuberance in said orthogonal planes not being in the same axial plane.

According to a preferred embodiment of said protuberance, its maximum radial height in each of said orthogonal planes has the same value, and there is at least one plane perpendicular to the axis of the rim, intermediate between said orthogonal planes, which has a radial height which is constant (in other words, cylindrical) and less than the maximum height. Preferably, said plane is the mid-plane and on it, this height is equal to half the previously mentioned maximum radial heights.

There also exits at least one plane on which the profile of said protuberance in the area between said orthogonal extremity planes, when viewed in an axial plane, presents a constant height with respect to the cylindrical surface that was defined previously.

The minimum value of the radial height of the circumferential development of said protuberance, quite conveniently, is reduced to zero in at least one of said orthogonal planes of the extremities.

Preferably, the maximum radial height of said protuberance is no more than 2% greater than the radius of said cylindrical surface, while the axial width, measured between said orthogonal end planes, is between 40% and 80% of the axial width of the corresponding bead seat.

A second object of the present invention is a tire-rim assembly, comprising the rim of this invention and a tire sized to fit that rim, characterized by the fact that in each plane orthogonal to the axis of said rim the circumferential extension of the protuberance is not greater than the inner circumferential extension of the cores in the bead of the tire to be mounted on that rim. Moreover, the protuberance extends radially outwardly, not exceeding the radially innermost radius of the core of the bead of the corresponding tire when the tire is mounted onto the rim and inflated to normal inflation.

BRIEF DESCRIPTION OF THE DRAWINGS

In any case, the present invention will be better understood with the aid of the following description and the attached figures, given solely by way of non-limiting example, wherein:

FIG. 1 is a radial cross-section of the rim portion of a bead and a corresponding protuberance in a first preferred embodiment;

FIG. 2 is a radial cross-section of a portion of a rim similar to that of FIG. 1, showing a second preferred embodiment of the invention; and FIG. 3 is a front view of a wheel rim showing the complete circumferential development of the protuberances of FIG. 1.

FIG. 4 is a diagrammatic representation of the superimposition of various protuberance profiles found along different circumferential portions of the rim illustrated is FIGS. 1-3.

With reference to FIG. 1, showing only a portion of the rim which comprises, at its two lateral portions, a bead seat 1 which is connected at its axially outer portion with a radially outwardly extending flange 2, usually known as a rim-flange, that serves for axially supporting the tire bead from the outside, as is illustrated in FIGS. 1 and 2.

Figure 5:
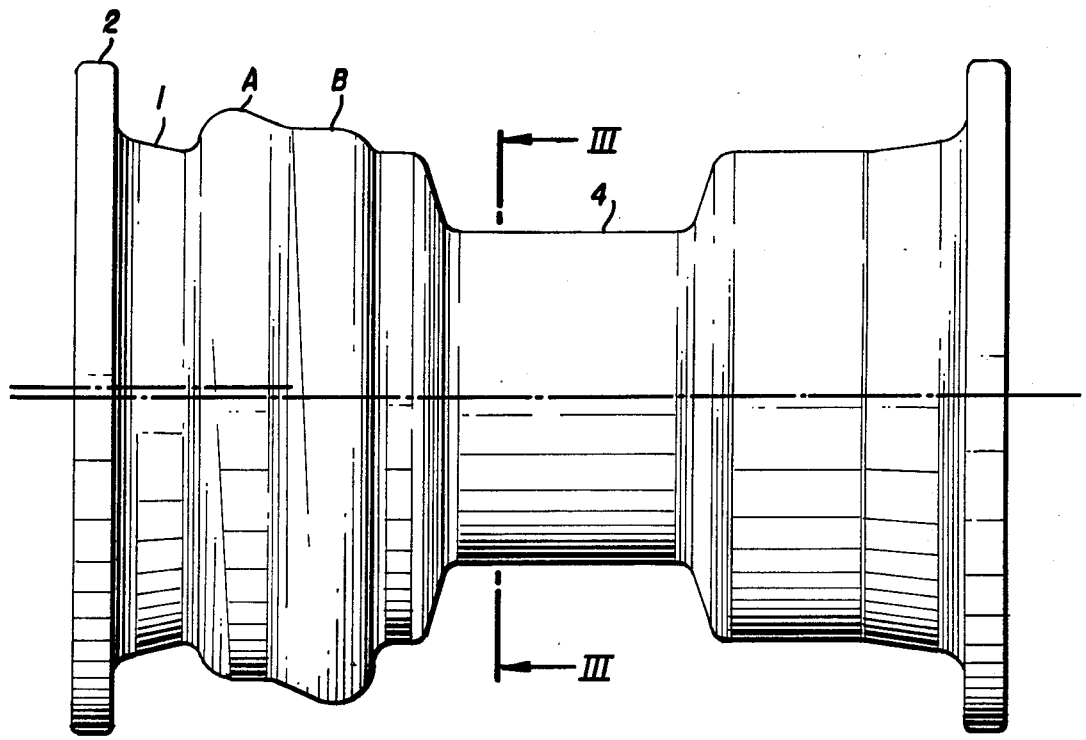
FIG. 5 is a plan view of a complete rim showing the profile of the protuberances.

At the axially inner extremity of at least one of the bead seats, preferably at both of them, there is a protuberance 3 that also protrudes radially outwardly with respect to the minimum diameter of bead seat 1. Protuberance 3 is also connected to the central well 4, which is preferably not centered with respect to the maximum width of the rim..

The radial height of this protuberance is measured with reference to an imaginary cylindrical surface, which is coaxial with the rim and constitutes an extension of the minimum diameter of the bead seat 1 extending axially towards the center of the rim; this extension 5 intersects with the plane of the drawing as indicated in FIG. 1.

Said cylindrical surface may be extended part of the protuberance, as it appears in FIG. 1, where it may extend from either part of the protuberance 3, either for connecting said protuberance with the bead seat and/or with the deep well 4; or else it can be extended from one part only, with respect to the protuberance; or it can be entirely lacking, as in FIG. 2, where the protuberance 3 is directly connected with both the bead base as well as with the deep well 4. Nevertheless, reference will be made to the imaginary cylindrical surface 5 for the purpose of defining the axial and radial dimensions of the protuberance. The afore-mentioned bead seat is usually inclined with respect to the tire axis, that is, a tapered seat at an angle of usually 5° to 15°, although the bead can, of course, be relatively flat, that is, cylindrical also.

FIG. 3 illustrates, in front elevation, the entire rim of the invention, viewed along line III—III which, in FIG. 1 is a plane orthogonal to the axis of rotation of the wheel.

In FIG. 3, there is shown rim-flange 2, the well 4 (base profile) and the imaginary cylindrical surface 5. In addition, one can see profiles 3a and 3b of the circumferential development, as viewed along planes "p" and "q" of FIG. 1.

In fact, as can clearly be seen when comparing FIGS. 1 and 3, the profile of the protuberance 3 varies in height with respect to the surface 5, both in the axial plane (FIG. 1) and along its circumferential development (FIG. 3).

In order to more fully understand the manner in which these profiles change, consider the circumferential development of the periphery of the protuberances beginning at point A in FIG. 3. In the radial cross-sectional view of FIG. 1, one would see not only the high point A of protuberance 3a, but also the relative profile B of protuberance 3b.

In clockwise travel from point A to point C in FIG. 3, the profiles of protuberances 3a and 3b would have changed relative to each other as well as relative to imaginary cylinder 5. In order to visualize the various relationships the profiles of the protuberances vary in relation to each other, they have all be diagramed in FIG. 4. However, it should be understood that this diagram only shows relative relationships of the various protuberances, and the rim does not contain the illustrated multiplicity of profiles at any one point, as shown herein. As should be clear, protuberances 3a and 3b are both circular in nature, but are generated about eccentric axes which are eccentric not only with respect to each other, but also with respect to the axis of the rim.

Returning to the travel about the rim, at point C the profiles of the protuberance 3a would be as shown in dotted line 6 in FIG. 4, with protuberance 3b shown in dotted lines 7. For ease of comparison, the profile at point C has been superimposed over the profile at part A in FIG. 4. The illustrated profiles at point V of FIG. 3, as shown in FIG. 4, would be the same as dotted lines 6 and 7. As one continues to point D, the protuberance 3b would be at a maximum height B' and protuberance 3a would have the minimum height relative to protuberance 3b, as shown at A'.

Hence, it appears clear that the protuberance 3, with reference to its circumferential development, presents a radial height that is variable, from a maximum value "H" to a minimum value "h", and vice-versa, along each of the two planes "p" and "q", orthogonal to the axis of the rim, which we shall consider further on in the text as the lateral extremities of said protuberance, the external surface of said planes "p" and "q" constituting the connection between the radially outer surface of said protuberance and the bead base and the well of the rim, respectively.

Each plane that is perpendicular to the rim axis and located between the planes "p" and "q" defines a precise profile of circumferential development of the protuberance 3, the radial height of which, with respect to the cylindrical surface 5, varies between a maximum and a minimum along said development. However, according to the version illustrated in FIG. 1, only along planes "p" and "q" does this maximum value reach the value of H. Moreover, it is to be noted that, in spite of this variation in height, the profile of said circumferential development is always circular. Thus protuberance 3a is generated about axis T and protuberances 3b about axis S, both as shown in FIG. 3.

Of course, it is possible to form the protuberance in such a way that there will exist further planes orthongonal to the rim axis and located between "p" and "q", on which the maximum height of the profile of the circumferential development reaches the value of H.

Thus, it is possible to form a rim in which the maximum value H is reached only along a single plane perpendicular to the axis; such a plane would be, preferably, one of the two planes at the extremities.

In any case, what has to be excluded is that the maximum radial heights of two distinct circumferential developments of the protuberance 3, even if diverse one from the other, lie in the same axial plane, as would, for example, be the case if in either the plane "p" or "q" of FIG. 1 there were simultaneously present both maximum profiles for 3a and 3b.

There is, of course, a plane perpendicular to the rim axis and inbetween the two planes "p" and "q", on which the radial height of the circumferential development is less than the maximum value H.

In the version of FIG. 1, where the maximum height H is attained only along planes "p" and "q", this further plane is the mid-plane m-m, on which the height of the circumferential profile of the protuberance 3 is equal to H/2.

Now, considering the profile of the protuberance 3 in a generic axial plane, from the FIGS. 1 and 3, it has already been explained that the height of this profile varies also in the axial sense, from a maximum to a minimum value, and vice-versa. Even in this direction, however, there exists at least one axial plane on which the height of the shaped profile is constant in the interval between the planes "p" and "q". In the case illustrated in the figures, this plane is the plane X—X and the relative axial profile of the protuberance is the profile, shown by dotted lines 6, 7 in FIG. 4, parallel to the rim axis.

FIG. 2 (that is easily understood on the basis of the previous FIG. 1 and, therefore, the unnecessary reference numerals have been eliminated here) illustrates an alternative form of the protuberance of this invention, according to which, said protuberance, as already mentioned previously, is directly connected to the bead base and to the well rim. The minimum radial height of the circumferential development of the protuberance is reduced to zero in one point axially in both the parts of said protuberance.

Moreover, when considering the effective physical dimensions of the protuberance 3, the maximum radial height H preferably is no more than 2% greater than the value of the radius R of the cylindrical surface 5, as measured from the center of the axis of rotation of the wheel rim, while the width of said protuberance in the area located between the above-mentioned planes "p" and "q" is preferably comprised between 40% and 80% of the axial dimension of the corresponding bead base 1.

These values make it possible to have an advantageous assembly of the rim (FIG. 5) with the corresponding tire (not shown).

In fact, when considering the above-mentioned assembly under the conditions of a tire inflated to normal inflation pressure, according to the invention it is preferable for the protuberance 3 not to extend radially outwardly beyond the limit constituted by the height, with respect to the cylindrical surface 5 of the radially innermost profile of the core in the bead of the corresponding tire, as is illustrated, in particular, in FIG. 2. Moreover, it is preferable that the circumferential development of the profile of said protuberance on each plane perpendicular to the rim axis, which is of a circular form (3a in FIG. 3), does not exceed the radially innermost circumference of the core in the bead of the corresponding tire.

In fact, these preferred conditions tend to assure the assembly thus formed will obtain all the advantages indicated at the beginning of the present description.

When considering the ease of assembly, it must be remembered that during the phase of mounting the tire onto the rim, the shifting of the bead is axial, i.e., the bead of the tire overcomes the protuberance through a radial oscillation of the plane of the bead almost simultaneously along the entire circumference in a particular plane.

It is hence easily understood that the protuberance of the invention, having in each plane perpendicular to the plane axis, a circumferential development less than the radially innermost development of the core of the tire bead to be mounted thereon and the maximum radial height, with respect to the bead base, not exceeding the radially innermost limit of the core, facilitates the mounting of the tire.

At the same time, the radially innermost surface of the bead is always in contact with the protuberance along its entire axial periphery, and not just along a circumferential line on the radially outer surface of the protuberance. Thus, any escape of air is impeded during the inflating of the tire and, hence, its mounting onto the rim is greatly facilitated since the air pressure inside the tire will act to force the tire bead axially outwardly to "home" on their respective bead seats.

The capacity of preventing the unseating of the tire bead is enhanced because the protuberance of the invention presents, along its entire circumference in the axial direction (i.e., according to the movement that takes place during bead unseating), a variable height between maximum and minimum, with the maximum values being circumferentially distributed along a certain enlarged arcs and with the minimum values being concentrated in restricted arcs of the protuberance's circumference; in other words (FIG. 3) the maximum values are distributed on both arcs of the protuberance symmetrical with respect to the plane X—X whereas said minimum values are concentrated on said plane.

The shifting of the tire bead, due to the axial force acting upon the tire during cornering, does not occur simultaneously over the entire circumference of the rim, but is restricted to a limited arc in the tire contact patch. Hence, the plane containing the core of the tire bead is forced during cornering, to be disposed obliquely with respect to the rim axis.

It clearly results, therefore, that the protuberance according to the invention, by virtue of its axial dimension acting in combination with a circumferential profile that presents, for a great part of its development, a radial height (with respect to the bead base) of maximum values, effectively prevents any bead unseating. In fact, to overcome the configuration of the protuberance, would require a great increase in the circumference of the tire bead core. However, this core is, by definition, substantially inextensible in the circumferential direction. Moreover, the ample surface contact between the bead surface and the radially outer surface of the protuberance prevents, even under critical conditions, any rotation of the bead (in the axial plane) around said protuberance.

It is intended that the present description is given by way of non-limiting example and, hence, within the scope of the present invention, are all those modifications and alternative variations that, although not expressly described here, are easily deducible from the present inventive idea.

We claim:

1. A rim for mounting a pneumatic tire, comprising:
   a pair of bead seats, each terminating in an axially outer portion with a radially outwardly extending flange;
   the axial inner edge of each bead seat defining a cylindrical surface coaxial with the rim axis;
   at least one of said bead seats being connected at its axial inner portion to a radially outwardly extending protuberance, the radial height of said protuberance varying from a maximum height to a minimum height with respect to said cylindrical surface in at least two distinct planes orthogonal to the rim axis;
   said variation in height being along the circumference of the protuberance and varying from said maximum height to said minimum height and back to said maximum height in a manner so that two areas of maximum height lie in two axial spaced apart distinct planes orthogonal to the rim axis.

2. The rim of claim 1, in which the two areas of maximum height are of the same height in said two distinct planes.

3. The rim of claim 2, in which there is an area of minimum radial height on the protuberance disposed between said two areas of maximum height, said area of minimum height lying on a plane perpendicular to the axis of the rim.

4. The rim of claim 4, in which the radial height of said area of minimum height is approximately one-half the radial height of said area of maximum height.

5. The rim of claim 1, in which there is at least one axial plane in which the profile of said protuberance is of constant radial height with respect to said cylindrical surface.

6. The rim of claim 1, in which the radial height of one portion of the circumference of said protuberance is equal to zero with respect to said cylindrical surface.

7. The rim of claim 1, in which the axial width of said protuberance is 40% to 80% of the axial width of the adjacent bead seat.

8. The rim of claim 1, in which the maximum radial height of said protuberance is no more than 2% greater than of the radious of said cylindrical surface.

9. The rim of claim 1, in which the outer circumferential development of said protuberance is not greater than the inner circumferential development of the bead core of the tire to be mounted upon said rim.

10. The rim of claim 1, in which the radial height of said protuberance is not greater than the inner radial height of the core of a tire mounted on the rim and inflated to normal inflation pressure.

* * * * *